US008740512B2

(12) United States Patent
Bomireddy et al.

(10) Patent No.: US 8,740,512 B2
(45) Date of Patent: Jun. 3, 2014

(54) 'O' FLUTE MULTIPURPOSE BIT

(75) Inventors: Krishna Sumanth Reddy Bomireddy, Schaumburg, IL (US); John Holba, Naperville, IL (US)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 13/097,626

(22) Filed: Apr. 29, 2011

(65) Prior Publication Data

US 2011/0268517 A1 Nov. 3, 2011

Related U.S. Application Data

(60) Provisional application No. 61/330,069, filed on Apr. 30, 2010.

(51) Int. Cl.
*B23B 51/08* (2006.01)
(52) U.S. Cl.
CPC ...................................... *B23B 51/08* (2013.01)
USPC ............................................. 408/26; 408/230
(58) Field of Classification Search
USPC .................. 407/53, 54; 408/230, 26, 30, 227
IPC ........................................................ B23B 51/08
See application file for complete search history.

(56) References Cited

U.S. PATENT DOCUMENTS

| | | | | | |
|---|---|---|---|---|---|
| 3,452,625 | A | * | 7/1969 | Russo | 408/223 |
| 5,323,823 | A | * | 6/1994 | Kopras | 144/219 |
| 5,380,133 | A | * | 1/1995 | Schimmer | 408/199 |
| 5,584,617 | A | * | 12/1996 | Houser | 408/1 R |
| 5,823,720 | A | | 10/1998 | Moore | |
| 5,846,035 | A | * | 12/1998 | Karafillis et al. | 408/1 R |
| 6,267,542 | B1 | * | 7/2001 | Salmon | 408/223 |
| 6,976,812 | B2 | * | 12/2005 | Kaneko et al. | 408/199 |
| 7,018,144 | B2 | * | 3/2006 | Sasagawa et al. | 408/230 |
| 2003/0147711 | A1 | * | 8/2003 | Risen, Jr. | 408/199 |
| 2007/0048100 | A1 | * | 3/2007 | Boyd et al. | 408/26 |
| 2009/0022561 | A1 | * | 1/2009 | Winebrenner | 408/230 |

FOREIGN PATENT DOCUMENTS

| | | |
|---|---|---|
| DE | 3820485 C1 * | 8/1989 |
| DE | 289231 A5 | 4/1991 |
| FR | 2749203 A1 | 12/1997 |

OTHER PUBLICATIONS

English machine translation of DE 3820485 C1.*
Invitation to Pay Additional Fees and, Where Applicable, Protest Fee in corresponding PCT application (i.e., PCT/US2011/034492), mailed Jul. 28, 2011 (4 pages).
Van Niser, "The router way", The IAPD Magazine, Mar. 2007, XP002649573, Retrieved from the Internet: URL:http://www.theiapdmagazine.com/pdf/magazine-archives/328.pdf [retrieved on Jul. 11, 2011] the whole document (2 pages).
Onsrud Cutter product p., "Spiral O Flute Router Bits"; 3 pages.
Amana Tool website page, "Aluminum Solid Carbide Router Bits"; http://www.amanatool.com/bits-fv/aluminum-spiral-bit-51402.html; published at least as early as Apr. 2, 2010; (2 pages).
Amana Tool website page, "Solid Carbide Plastic Router Bits"; http://www.amanatools.com/bits-fv/plastic-spiral-bit-51404.html; published at least as early as Apr. 2, 2010; (2 pages).

* cited by examiner

*Primary Examiner* — Andrea Wellington
*Assistant Examiner* — Alan Snyder
(74) *Attorney, Agent, or Firm* — Maginot, Moore & Beck

(57) ABSTRACT

A tool bit providing a combined drill bit and milling bit is disclosed herein. The tool bit in one embodiment includes a working section having a longitudinally extending central axis, an O-flute extending along the working section, and a tooth formed at a tip portion of the working section, the tooth offset from the central axis.

19 Claims, 4 Drawing Sheets

'O' FLUTE MULTIPURPOSE BIT

This patent claims the benefit of U.S. Provisional Application No. 61/330,069, filed Apr. 30, 2010, the entire contents of which are herein incorporated by reference.

FIELD

This patent relates to the field of drill bits, and more particularly to combination milling and plunge cut drill bits.

BACKGROUND

Drill bits are widely used for drilling holes in various materials, including wood, wood laminates, plastic countertop material, metals, and other natural or artificial materials. Generally, a drill bit may be used to form drill holes in a work piece by plunge cutting into the work piece along the axis of the drill bit. In addition to the ability to drill holes, some drill bits also include the ability to perform other shaping processes. For example, some drill bits are ground to a high precision to provide a reaming function. Other drill bits include cutting features that allow the bit be used as a milling device wherein the drill bit is used to cut in a lateral direction (i.e., a direction perpendicular to the axis of the drill bit).

Although drill bits with plunge and milling ability in metal have been provided in the past, these combined drill and milling bits have not performed optimally when used to shape plastic materials. For example, many drill bits form ridges and burrs along drilled holes and milled grooves. Additionally, the relative softness of plastics can result in loss of control over the formation of a groove or an axial cut when a bit is used in a hand power tool. Loss of control occurs because a bit can aggressively bite into the soft material. Thus, small perturbations in the angle of attack can generate significant off-axis forces which a user may not be able to control.

Accordingly, a multipurpose bit including features that stabilize the bit and keep it on line when initially boring into a work piece is desired. A multipurpose bit that produces clean cuts and thus do not result in burring or ridges in softer materials is also desired. A further need exists for a multipurpose bit that is easier to control when shaping softer materials is also needed.

SUMMARY

A tool bit providing a combined drill bit and milling bit is disclosed herein. The tool bit in one embodiment includes a working section having a longitudinally extending central axis, an O-flute extending along the working section, and a tooth formed at a tip portion of the working section, the tooth offset from the central axis.

In a further embodiment, a tool bit includes a working section having a longitudinally extending central axis, an O-flute extending along the working section toward an upper portion of the working section, a trailing edge defined by a junction of a trailing face and a first upper end portion of the O-flute, a cutting edge defined by a junction of a leading face and a second upper end portion of the O-flute, and a tooth defined in part by the leading face, the tooth extending along the central axis to a location higher than the trailing face.

DESCRIPTION

Figure 1:
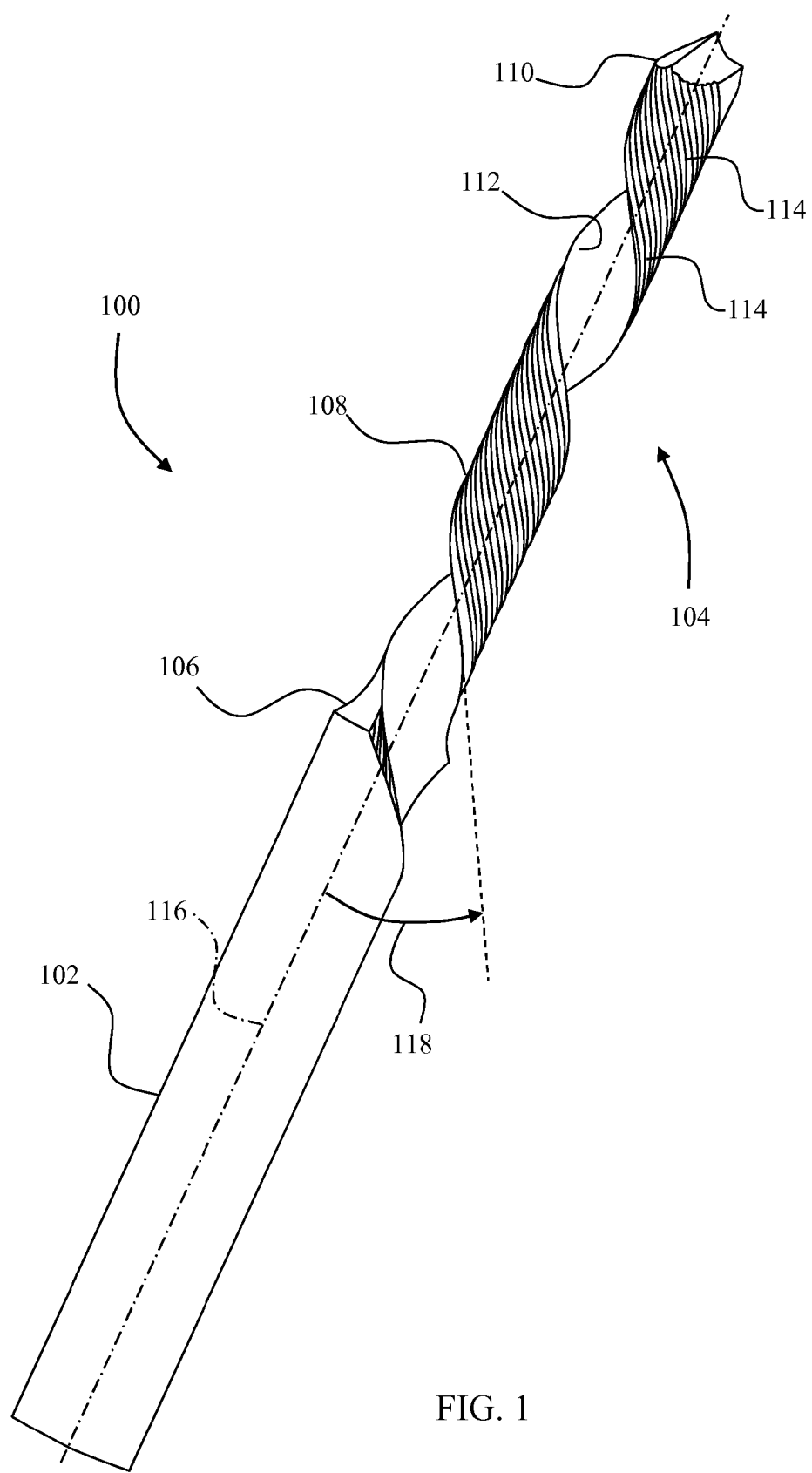
FIG. 1 depicts a back-side plan view of one embodiment of a combination drilling and milling bit in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present patent includes any alterations and modifications to the illustrated embodiments and includes further applications of the principles of the invention as would normally occur to one skilled in the art to which this invention pertains.

With reference to FIG. 1, one embodiment of a tool bit 100 is shown in the form of a combined boring and milling bit. The tool bit 100 includes a shank portion 102, a working section 104, and a washout section 106 located between the shank portion 102 and the working section 104. The tool bit 100 may be made from a carbide material, such as a grade WA2 carbide, so that the tool bit 100 may be used to plunge cut metals and other hard materials. Other materials may be used for other applications.

Figure 2:
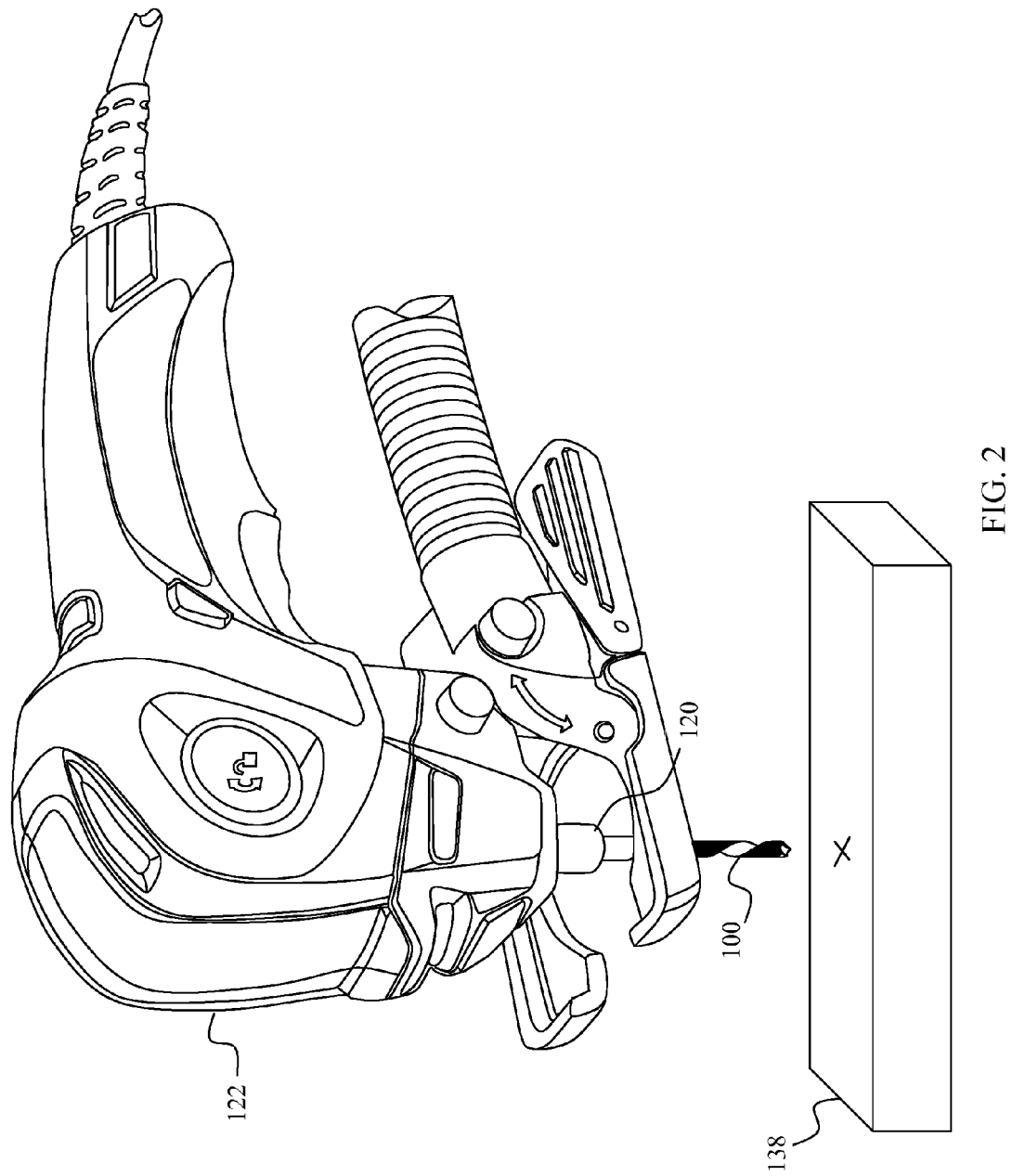
FIG. 2 depicts the combination drilling and milling bit of FIG. 1 positioned in a hand drilling tool.

The shank portion 102 is configured to engage a power hand drill or other rotating apparatus. Thus, FIG. 2 depicts the tool bit 100 held in a chuck 120 of a hand drilling tool 122 in preparation for making a plunge cut into a work piece 138. The working section 104 includes a body portion 108 and an upper portion 110. The working section 104 includes a body portion 108 and an upper portion 110.

The body portion 108 includes an O-flute 112 and a number of relief faces 114 that extend upwardly from the washout section 106 to the upper portion 110. Both the O-flute 112 and the relief faces 114 extend helically about a central axis 116 of the tool bit 100 in the embodiment of FIG. 1. The O-flute 112 and the central axis 116 define a helix angle 118 of the O-flute 112. In one embodiment, the helix angle 118 is greater than about 25 degrees and preferably between 30 and 35 degrees. In the embodiment of FIG. 1, the helix angle 118 is about 33 degrees.

Figure 3:
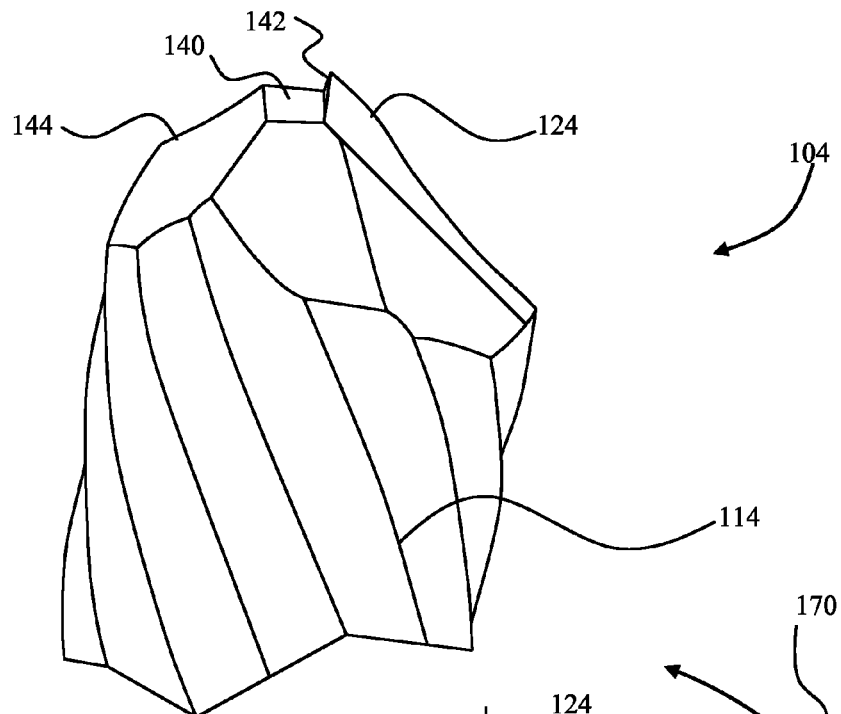
FIG. 3 depicts an enlarged rear perspective view of a boring end of the tool bit of FIG. 1.

FIG. 1 depicts the tool bit 100 with a number of relief faces 114. In other embodiments, more or fewer relief faces may be included, depending on the desired application. By way of example, the tool bit 100 is depicted in FIG. 3 with 7 relief faces 114. Generally, about 7-10 relief faces may be provided as desired.

Figure 4:
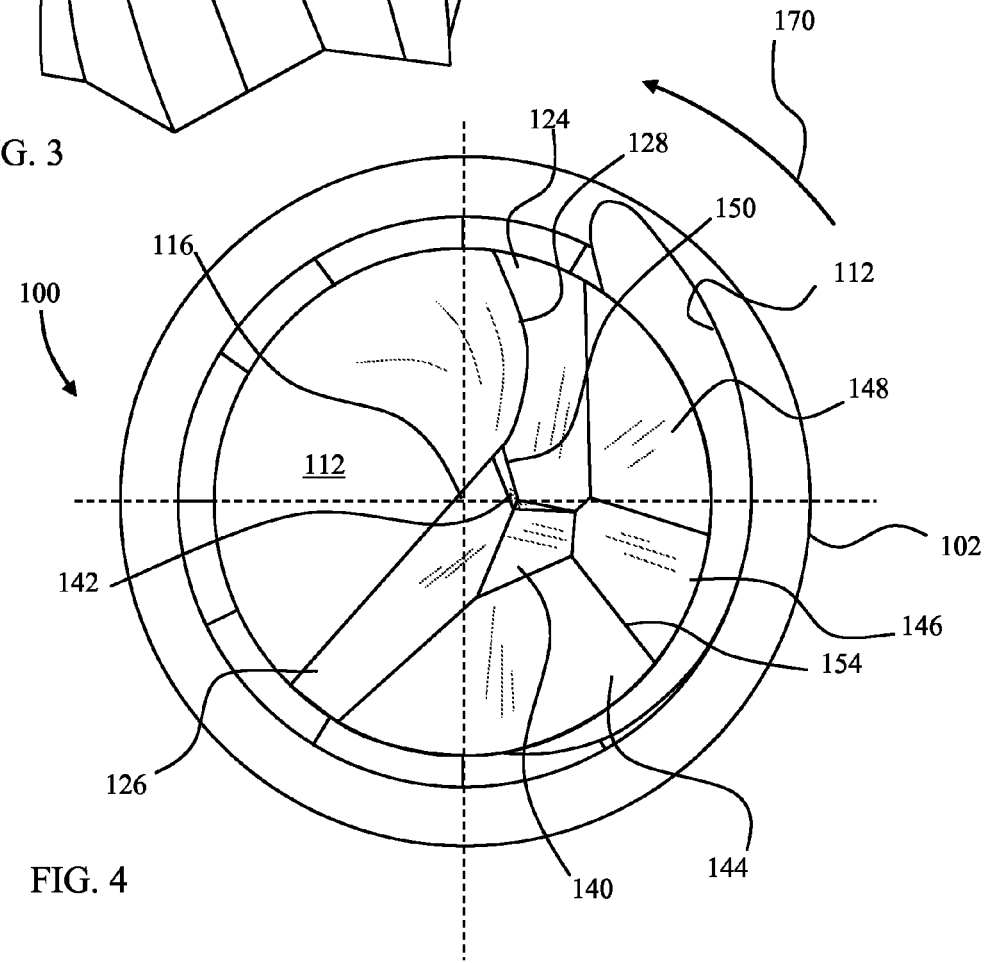
FIG. 4 depicts a top plan view of the tool bit of FIG. 1.
Figure 5:
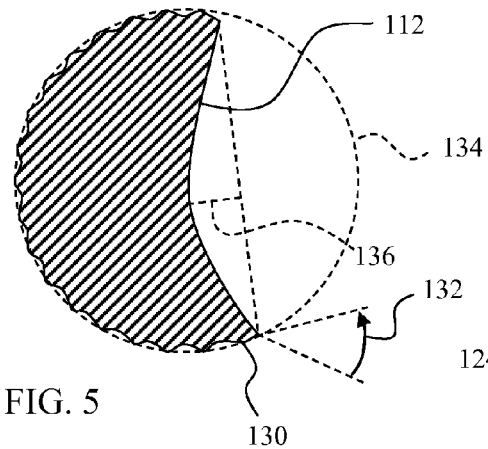
FIG. 5 depicts a simplified cross-sectional view of the body of the tool bit of FIG. 1 showing the core of the body.

With reference to FIGS. 3 and 4, the upper portion 110 includes a leading face 124 and a trailing face 126. The leading face 124 forms a cutting edge 128 with an upper portion of the O-flute 112. The cutting edge 128 extends from the upper portion 110 through the body portion 108. Within the body portion 108, an outer periphery 130 and the O-flute 112 define a rake angle 132 as depicted in FIG. 5. In one embodiment, the rake angle 132 is about 25 degrees.

The O-flute 112 is further configured to maintain a core within the body portion 108 of about 60 percent. The "core" refers to the amount of material in the body portion 108 compared to the volume possible for a given effective diameter of the body portion 108. Thus, in FIG. 5 the effective circumference of the body portion 108 is identified by the dashed circle 134. Of the area encircled by the effective circumference 134, the body portion 108 occupies about 60 percent. The core is thus a function of the relative placement of the O-flute 112 within the effective circumference 134 as well as a depth 136 of the O-flute 112. In one embodiment, the O-flute 112 has a depth 136 of 1.27 mm within a body portion 108 with an effective radius of 1.5 mm.

Figure 6:
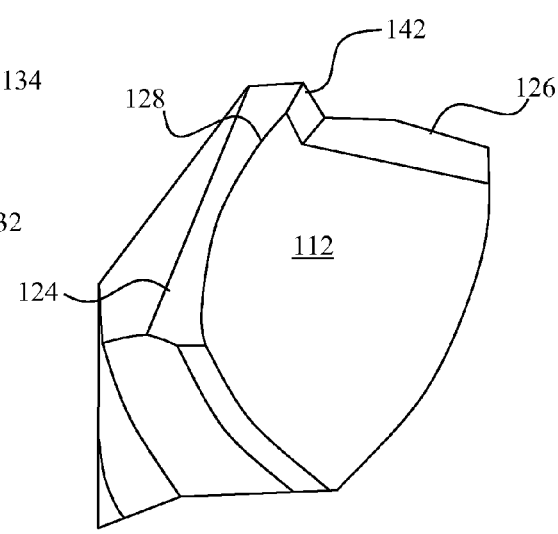
FIG. 6 depicts a partial front plan view of the tool bit of FIG. 1 rotated about ninety degrees from the view of FIG. 3.
Figure 7:
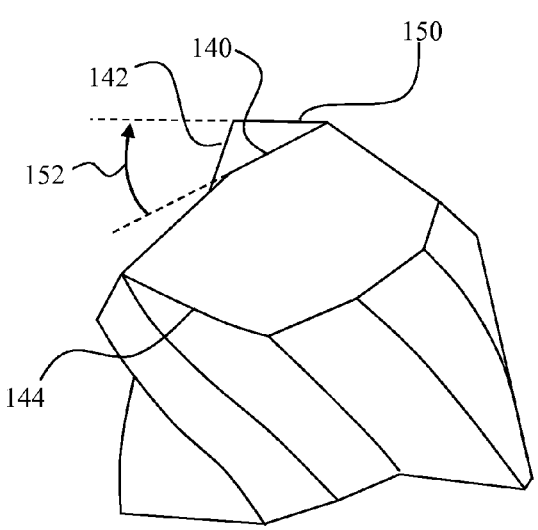
FIG. 7 depicts a partial left side plan view of the tool bit of FIG. 1.

Returning to FIGS. 3 and 4, the upper portion 110 further includes a gash 140 that is located between a tooth 142 and a face 144 generally opposite to the leading face 124. Two faces 146 and 148 are located circumferentially between the leading face 124 and the opposite face 144. Further description of the upper portion 110 is provided with additional reference to FIGS. 6-8.

The tooth 142 is defined in part by the leading face 124 and extends to a height along the central axis 116 that is higher than the highest portion of the trailing face 126. An upper edge 150 of the tooth 142 is substantially perpendicular to the central axis 116 when viewed from the left side of the tool bit 100 (see, e.g., FIG. 7). The tooth 142, however, is offset from the central axis 116 as shown most clearly in FIG. 4. The upper edge 150 and the gash 140 define a gash angle 152 shown most clearly in FIG. 7. In one embodiment, the gash angle 152 is about 25 degrees.

Figure 8:
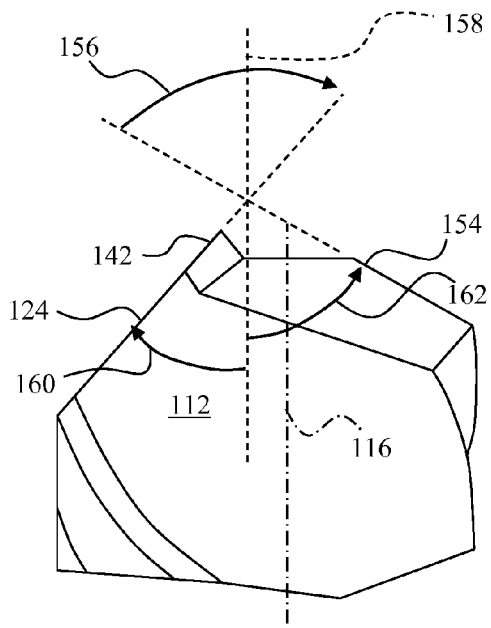
FIG. 8 depicts a partial front plan view of the tool bit of FIG. 1.

The plane defined by the leading face 124 and the line defined by a junction 154 of the opposite face 144 and the face 146 define a head angle 156 as shown in FIG. 8. The head angle 156 is not symmetrical about an axis 158 parallel to the central axis 116. Rather, a leading angle 160 between the axis 158 and the leading face 124 is smaller than a trailing angle 162 between the axis 158 and the junction 154. By way of example, in one embodiment the head angle 156 is about 100 degrees with the leading angle 160 being about 40 degrees and the trailing angle 162 being about 60 degrees.

In operation, the shank 102 of the tool bit 100 is positioned in the chuck of a drill or other rotary tool. The tool causes the tool bit 100 to rotate about the central axis 116 in the direction of the arrow 170 of FIG. 4. In order to drill a hole, the user places the upper portion 110 of the tool bit 100 against a work piece, such as a piece of plastic, at a desired location and forces the tool bit 100 toward the work piece.

The tooth 142 is the highest point of the tool bit 100 along the central axis 116. Accordingly, as the tool bit 100 contacts the work piece, the tooth 142 makes initial contact with the work piece. Rotation of the tool bit 100 in the direction of the arrow 170 of FIG. 4 causes the cutting edge 128 along the tooth 142 to sweep a circular path in the work piece. Debris formed by the tooth 142 is directed by the trailing face 126 into the O-flute 112. Rate of movement of the tool bit 100 into the work piece is controlled by the junction 154 because the trailing angle 162 is larger than the leading angle 160. In other words, the junction 154 is closer to perpendicular with the central axis 116 than is the face 124, thus limiting movement into the work piece. Moreover, the large head angle 156 significantly increases the strength of the upper portion 110 which is the portion of the tool bit 100 which normally limits useful life of the tool bit 100 for plunge cuts.

As the tool bit 100 progresses deeper into the work piece, the cutting edge 128 at the junction of the leading face 124 and the upper portion of the O-flute 112 begins to generate debris. This debris is directed into the O-flute 112. The O-flute 112 is smooth throughout the body portion 108. Accordingly, debris is passed smoothly away from the contact area between the cutting edge 128 and the work piece.

In the event that the user desires to form a grove in the work piece, lateral pressure is applied to the tool bit 100. The pressure forces the outer periphery 130 of the body portion 108 against the work piece at a lateral working area that extends along the axis 116 of the tool bit 100. As the O-flute 112 rotates into alignment with the direction of the applied force at the lateral working area, the tool bit 100 is allowed to advance in the direction of the applied force. As the tool bit 100 continues to rotate, the edge formed by the O-flute 112 and the outer periphery 130 rotates into the lateral working area and functions as a lateral cutting edge. The debris generated by the lateral cutting edge is directed into the O-flute and is carried away from the contact area between the tool bit 100 and the work piece.

The rake angle 132, along with the amount of lateral force applied by a user, thus affects the aggressiveness with which the tool bit 100 "bites into" the lateral working area of the work piece when the tool bit 100 is used as a milling bit. The advancement of the tool bit 100 into the lateral working area is controlled, however, by the relief faces 114 which contact the work piece at locations adjacent to the O-flute 112 (e.g., above and below the O-flute 112) in the lateral working area. Moreover, for a given flute width, the increased helix angle 118 reduces the axial distance between contact points of the relief faces 114 at locations adjacent to the O-flute 112 in the lateral working area. Accordingly, a user has improved control of the movement of the tool bit 100 into the work piece resulting in a smoother cut.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A tool bit comprising:
    a working section having a longitudinally extending central axis;
    an O-flute extending along the working section;
    a tooth formed at a tip portion of the working section, the tooth offset from the central axis; and
    a cutting edge extending inwardly and upwardly from an outer diameter of the bit and defined in part by the tooth, wherein:
    the cutting edge is curved from an outermost portion to an innermost portion; and
    the cutting edge is further defined by a junction of a leading face and the O-flute, the leading face defining a portion of the tooth.

2. The tool bit of claim 1, further comprising:
    an opposite face located about 180 degrees behind the leading face; and
    a gash positioned between the leading face and the opposite face.

3. The tool bit of claim 2, wherein a plane defined by the leading face and a line defined by the opposite face define a head angle of about 100 degrees and the head angle is centered at a location offset from the central axis.

4. The tool bit of claim 2, wherein the tooth and the gash define a gash angle of about 25 degrees.

5. The tool bit of claim 2, wherein the O-flute extends helically about the central axis.

6. The tool bit of claim 5, wherein the O-flute and the central axis define a helix angle of greater than 25 degrees.

7. The tool bit of claim 6, wherein the O-flute and the central axis define a helix angle of between 30 and 35 degrees.

8. The tool bit of claim 7, wherein the O-flute and the central axis define a helix angle of about 33 degrees.

9. The tool bit of claim 5, wherein the O-flute defines a core of about 60 percent of the effective diameter of the working section.

10. The tool bit of claim 9, wherein the O-flute and an outer periphery of the working section define a rake angle of about 25 degrees.

11. The tool bit of claim 5, further comprising:
a shank portion; and
a washout area located between the working section and the shank portion, the washout portion extending only about 0.15 inches along the central axis.

12. The tool bit of claim 5, further comprising:
a plurality of reliefs formed in an exterior surface of the working section and generally opposite to the O-flute, each of the plurality of reliefs extending helically about the central axis.

13. A tool bit comprising:
a working section having a longitudinally extending central axis;
an O-flute extending along the working section toward an upper portion of the working section;
a trailing edge defined by a junction of a trailing face and a first upper end portion of the O-flute;
a cutting edge defined by a junction of a leading face and a second upper end portion of the O-flute; and
a tooth having a highest portion spaced apart from an outer diameter of the working section and defined in part by the leading face, the tooth extending along the central axis to a location higher than any other portion of the tool bit.

14. The tool bit of claim 13, wherein the tooth includes an upper tip, the upper tip spaced apart from the central axis.

15. The tool bit of claim 14, further comprising:
a second face generally opposite to the leading face, the second face and the leading face defining a head angle of about 100 degrees and the head angle is centered at a location offset from the central axis.

16. The tool bit of claim 14, further comprising:
a gash surface adjacent to the tooth; and
a gash angle of about 25 degrees defined by the gash surface and the upper tip.

17. The tool bit of claim 14, wherein the O-flute defines a core of about 60 percent of the effective diameter of the working section.

18. The tool bit of claim 17, wherein the O-flute extends helically about the central axis.

19. The tool bit of claim 18, wherein the O-flute and the central axis define a helix angle of about 33 degrees.

* * * * *